United States Patent [19]

Weiselfish et al.

[11] Patent Number: 4,700,633
[45] Date of Patent: Oct. 20, 1987

[54] TRACKING APPARATUS IN CONVEYORIZED TRANSPORT SYSTEM

[75] Inventors: Jacob Weiselfish, West Hartford; George Collins, Somers, both of Conn.

[73] Assignee: Gerber Garment Technology, Tolland, Conn.

[21] Appl. No.: 821,164

[22] Filed: Jan. 21, 1986

[51] Int. Cl.⁴ .................... B61B 3/00; E01B 25/26
[52] U.S. Cl. ................................ 104/102; 104/130
[58] Field of Search .................... 104/88, 102, 130; 198/349, 350, 465.4

[56] References Cited

U.S. PATENT DOCUMENTS

| | | | |
|---|---|---|---|
| 3,610,159 | 10/1971 | Fickenscher | 104/88 |
| 3,734,027 | 5/1973 | Brummett et al. | 104/88 X |
| 3,935,820 | 2/1976 | Lancaster | 104/88 |
| 4,208,765 | 6/1980 | Denefe | 104/88 X |
| 4,597,495 | 7/1986 | Knosby | 104/88 X |
| 4,615,273 | 10/1986 | Osthus et al. | 104/102 |

Primary Examiner—Robert B. Reeves
Assistant Examiner—Charles Barrett
Attorney, Agent, or Firm—McCormick, Paulding & Huber

[57] ABSTRACT

A tracking arrangement for a conveyorized transport system of the type in which coded workpiece carriers are routed by a switching mechanism from a main rail to an entry end of a subsidiary loop and then returned to the switching mechanism via a discharge end of the subsidiary loop, the entry end of the subsidiary loop being located downstream of the discharge end relative to the general direction of carrier movement on the carrier rail. The tracking arrangement comprises a sensor which reads the codes on the carriers while the carriers are located on the switching mechanism so that the codes may be read shortly before a carrier enters into a subsidiary loop and shortly after the carrier exits from a subsidiary loop. A second subsidiary loop may be provided directly across the main rail of the aforesaid subsidiary loop, the switching mechanism also servicing the second subsidiary loop, and the sensor reading the codes on the carrier shortly before the carriers enter into the second subsidiary loop and exit from the second subsidiary loop.

11 Claims, 8 Drawing Figures

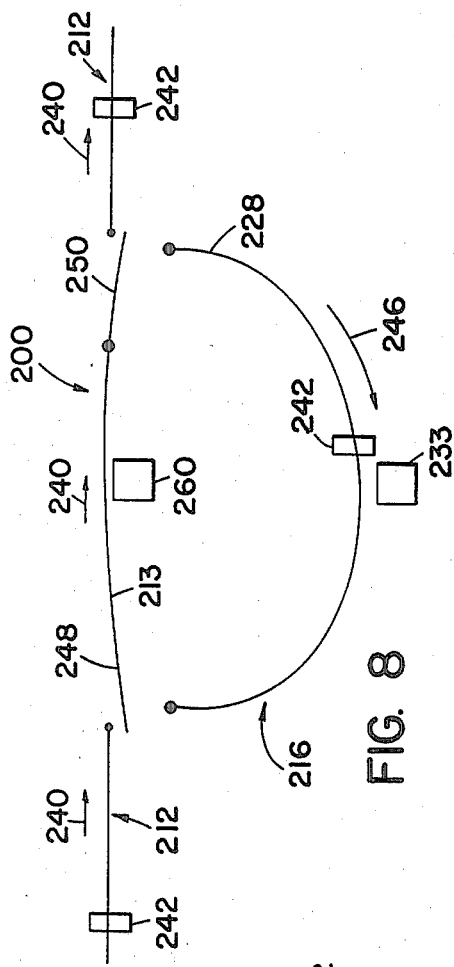
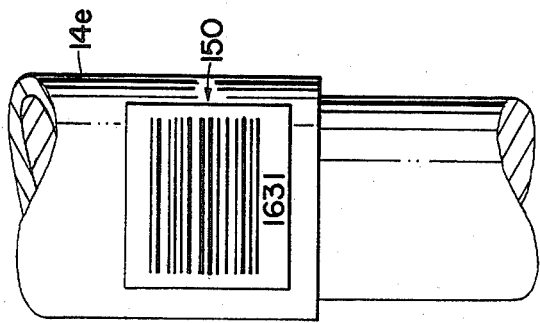
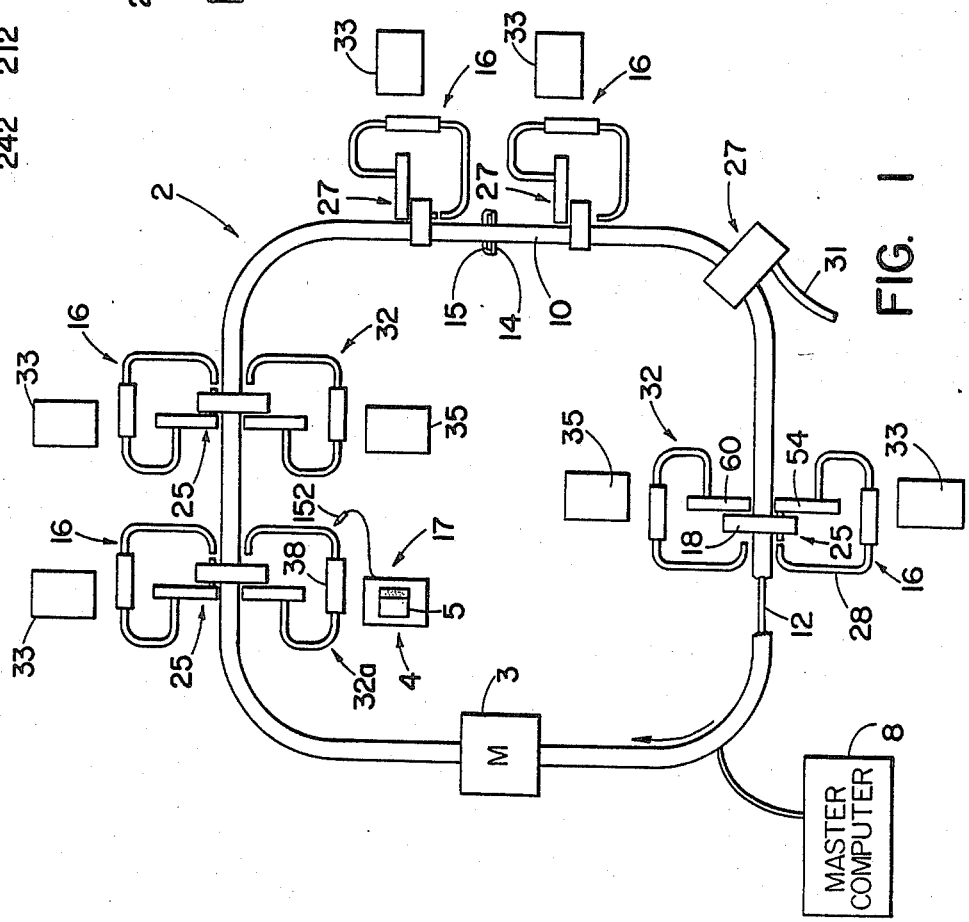

TRACKING APPARATUS IN CONVEYORIZED TRANSPORT SYSTEM

BACKGROUND OF THE INVENTION AND OTHER INFORMATION

The invention relates generally to conveyorized transport systems and deals more particularly with a system for tracking carriers in a computer controlled carrier and rail network.

Trolley and rail networks were previously known which utilize a main rail to guide workpiece carrying trolleys to subsidiary loops located along the main rail, each subsidiary loop leading to and from an associated work station. By way of example, the workpieces may be garments and the work stations may be sewing stations.

A sensor may be provided adjacent to a loading region of the main rail to read codes on the trolleys as the trolleys are loaded, and an operator may enter data into a computer to indicate the type of workpieces which the trolleys carry. Then the computer schedules the trolleys to proceed to various ones of the work stations. By controlling a means for driving the trolleys and the switches, the computer usually knows the approximate locations of the trolleys. However, occasionally a trolley falls off the main rail or subsidiary loops or is intentionally removed from them and not immediately returned to the proper rail or returned to a different location relative to the driving means. In addition, a new carrier may be added to the main rail or subsidiary loops. In which cases, it is important that the computer soon learns of the change to trolley location, its absence, or the presence of the new carrier.

In one previously known trolley and rail network, two switches are provided between the main rail and each subsidiary loop. One switch is located at the upstream end of the subsidiary loop relative to the direction of travel of the trolleys along the main rail to divert a trolley and the workpieces it carries from the main rail to the subsidiary loop and another switch is located at the downstream end of the subsidiary loop to return the trolley to the main rail. Additional trolley code sensors are located along the main rail immediately upstream of the switches which divert the trolleys from the main rail to the subsidiary loops to periodically inform the computer of the location of the trolleys so that the computer can update its tracking information as needed. A drawback to this arrangement of switches and sensors is that the trolley codes may only be read on their way into a subsidiary loop (or past it if it bypasses the subsidiary loop) and if a trolley is misplaced in a loop or removed from it, the computer will not learn of the event until the time that the trolley was scheduled to approach the next take-off switch. If additional sensors were installed after the return switches this would add to the cost and complexity of the tracking system.

Another type of trolley and rail network is disclosed in U.S. Pat. Application Ser. No. 683,379 filed Dec. 19, 1984 by Harold Osthus and Roald Nymark, assigned to the assignee of the present invention and hereby incorporated by reference as part of the present disclosure. This type of trolley and rail network includes a main rail and paired and unpaired subsidiary loops located along the main rail, each subsidiary loop leading to and from a work station. The subsidiary loops of each pair are located on opposite sides of the main rail directly across from one another. The network also includes a switching means for each pair of subsidiary loops or each unpaired subsidiary loop for transferring a trolley between the main rail and the subsidiary loops. Each of the subsidiary loops has an entrance and an exit, the entrance being located downstream of the exit relative to the general direction of trolley movement on the main rail. The switching means transfers a carrier from the main rail to the entrance of the associated subsidiary loop and later receives the carrier from the exit of the loop. This switching means and subsidiary loop configuration provides flexibility in routing; a trolley may be routed in three different ways from the exit of each paired subsidiary loop or in two ways from the exit of each unpaired subsidiary loop. At the exit of a paired subsidiary loop, the trolley can be routed back to the main rail for movement downstream to another subsidiary loop, across the main rail to the other subsidiary loop of the pair or from the discharge end of one subsidiary loop directly to the entrance of the same subsidiary loop for recirculation purposes. The computer may initiate the recirculation for a variety of reasons, for example, to rearrange the ordering of the trolleys so that one work operation may be performed before another work operation or so that garments which require sewing by a particular type or color of thread may be grouped together.

Trolleys in this second type of trolley and rail network may be outfitted with machine readable codes as in the first type of trolley and rail network to identify the trolleys, and when the trolleys are initially loaded onto the main rail, an operator may enter into the computer the type of garments or other workpieces which are carried by the trolleys. Then, the computer directs the movements of the trolleys along the network. As in the first type of trolley and rail network, occasionally trolleys are removed from the network or become misplaced. Often several trolleys collect in a subsidiary loop while they await attention by an operator and because of the physical contact there between the operator and the trolleys and workpieces they carry, a trolley may be inadvertently knocked off the subsidiary loop rail, and either be left unnoticed or be replaced at the wrong location relative to the other trolleys in the subsidiary loop. Under these conditions, if one or more of the trolleys in the subsidiary loop is scheduled for recirculation or transfer to the opposite subsidiary loop, scheduling errors may occur.

Accordingly, a general object of the present invention is to provide in a conveyorized transport system of the type in which coded workpiece carriers are routed by a switching means from a main rail to an entry end of a subsidiary loop and then returned to the switching means via a discharge end of the subsidiary loop, the entry end of the subsidiary loop being located downstream of the discharge end relative to the general direction of carrier movement on the main rail; a tracking means for reading the code on a carrier as it proceeds into and out of the subsidiary loop.

A more specific object of the tracking means of the foregoing type is to require only one sensor per subsidiary loop or pair of subsidiary loops, which subsidiary loops of each pair being located directly across the main rail from each other.

Another specific object is to provide a conveyorized transport system having a tracking means of the foregoing type which will detect errors in trolley location before a trolley which exits from one subsidiary loop is transferred downstream of the subsidiary loop, recirculated within the same subsidiary loop or transferred to an opposite subsidiary loop located across the main rail from the aforesaid subsidiary loop.

SUMMARY OF THE INVENTION

The invention resides in an improved tracking means for a conveyorized transport system of the type in which coded workpiece carriers are routed by a switching means from a main rail to an entry end of a subsidiary loop and then returned to the switching means via a discharge end of the subsidiary loop, the entry end of the subsidiary loop being located downstream of the discharge end relative to the general direction of carrier movement on the main rail. The switching means may comprise one or more switches and the tracking means comprises a sensor for reading the codes on the carriers while the carriers are located on a switch of the switching means if only one switch is provided or between switches of the switching means if two or more switches are provided so that the sensor may read the codes shortly before a carrier enters into a subsidiary loop and shortly after the carrier exits from a subsidiary loop.

According to one feature of the invention, a second subsidiary loop may be provided directly across the main rail from the aforesaid subsidiary loop, the switching means including means for switching a carrier from the main rail to either of the two subsidiary loops or from one subsidiary loop to the other subsidiary loop and the sensing means includes means for enabling the sensor to read the code while the switching means is positioned to switch the carrier in any of the aforesaid ways.

BRIEF DESCRIPTION OF THE FIGURES

FIG. 1 is a top schematic view of a conveyorized transport system in which the present invention is embodied.

FIG. 6 is a side view of a trolley of the system of FIG. 1 and shows a bar code on the trolley.

FIG. 8 is a top schematic view of another conveyorized transport system in which the invention is embodied.

DETAILED DESCRIPTION OF THE PREFERRED EMBODIMENT

Figure 7:
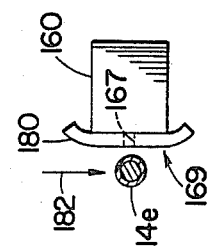
FIG. 7 is a top view of the sensor of FIG. 4 taken on the line 7—7.

Turning now to the figures, FIG. 1 illustrates a conveyorized transport system generally designated 2 in which the invention is embodied. The system 2 includes a master computer 8, a propulsion track 10 having wide pushers 15, 15 (FIG. 2) extending downwardly from it, a drive unit 3 for the propulsion track 10, a main rail 12 situated beneath the propulsion track 10, trolleys 14, 14 (FIG. 2) riding on the rail 12 and propelled by the pushers 15, 15 in the clockwise direction, subsidiary loops 16, 16 and 32, 32 located along the main rail some of which are paired and a tracking system 17 for tracking the trolleys. Each subsidiary loop leads to and from a work station 4, 33, 35. The conveyorized transport system further includes three-position switches 25, 25 for routing the trolleys between the main rail and each pair of subsidiary loops or directly between the subsidiary loops of a given pair, and for recirculating the trolleys as needed within a subsidiary loop. Two-position switches 27, 27 are also provided for routing the trolleys between the main rail and each unpaired subsidiary loop or a diversion rail 31 and for recirculating the trolleys within a subsidiary loop.

Figure 2:
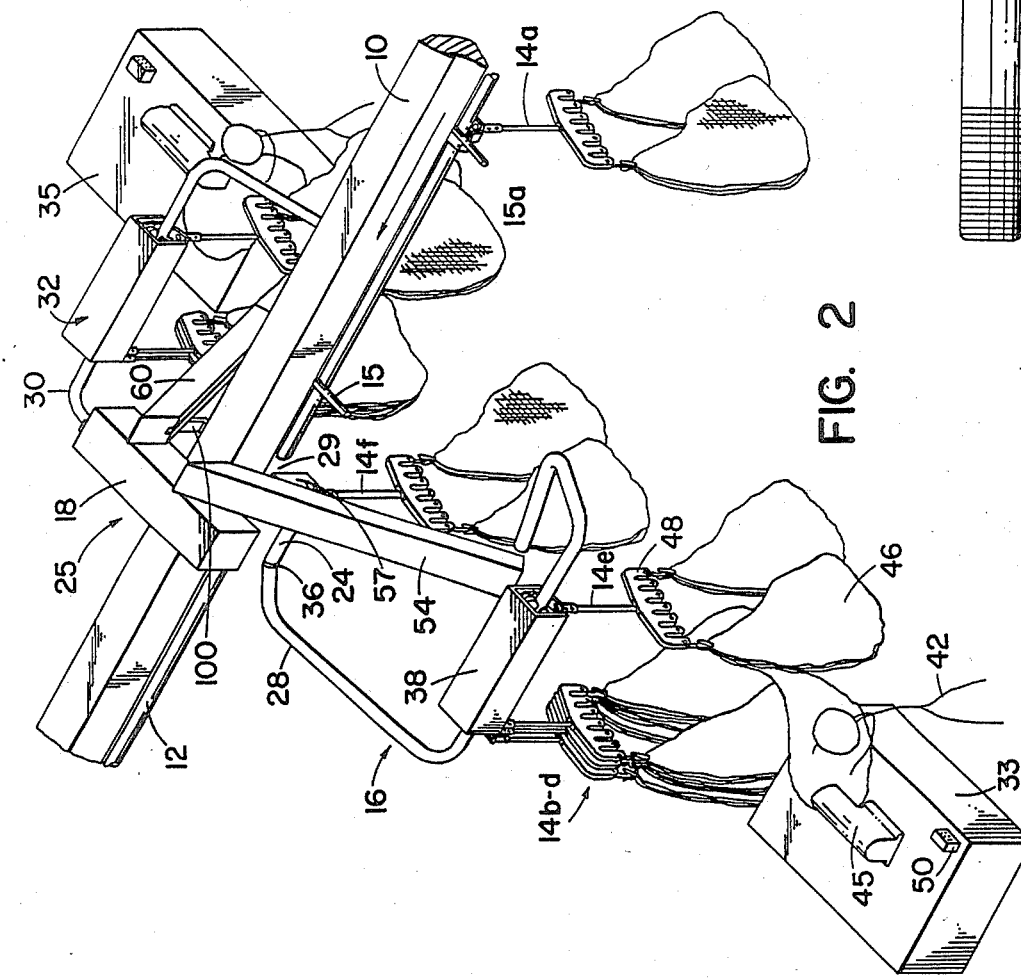
FIG. 2 is a perspective view of a section of the conveyorized transport system of FIG. 1 and includes a stretch of main rail and propulsion track plus two oppositely disposed subsidiary loops, associated work stations and an associated transfer switch.

FIG. 2 illustrates a section of the computer controlled, conveyorized transport system of FIG. 1, and shows the main rail 12, the propulsion track 10 situated over main rail 12 and a pair of subsidiary loops 16 and 32. One of the trolleys 14, specifically identified as 14a, rides on main rail 12 and is propelled by one of the pushers 15 specifically identified as 5a. Pusher 15a is one of a series of identical pushers uniformly spaced along and extending downwardly from the track 10. The pusher 15a itself is driven by an endless, moving chain located within the overhead propulsion track 10, and in FIG. 1, the pusher is shown moving trolley 14a toward the subsidiary loop 16. The subsidiary loop 16 includes looping rail 28, stop 38, and elevator 54, and the oppositely disposed subsidiary loop 32 is a mirror image of the loop 16. The main rail 12, transfer rail section 24, and the looping rails 28 and 30 preferably are made of a pipe or pipes.

The main rail 10, subsidiary loop 16, and subsidiary loop 32 each have a gap lined up with one other, and the switch 25 includes a straight section of rail 24 and an actuator apparatus 18 which is under computer control. Actuator apparatus 18 can move rail section 24 laterally between a first position (as shown) bridging the gap in subsidiary loop 16, a second position bridging the gap 29 in main rail 12, and a third position bridging a gap (not shown) in subsidiary loop 32. As the rail section 24 moves between its three positions, it can tranfer a trolley 14 from the main rail 12 to either subsidiary loop or from the subsidiary loop 16 to the opposite subsidiary loop 32 or vice versa. While the trolley is on the transfer rail section 24, a pusher 15 continues to engage the trolley and exert a positive driving force on it since the pusher is wide enough to reach the trolley when the rail section is in any of its positions. If the transfer rail is in the gap of subsidiary loop 16, the pusher will continue to move the trolley until the trolley is past the transfer rail section and beyond the entrance 36 of the subsidiary loop.

Once the trolley reaches looping rail 28, the actuator returns the transfer rail 24 to the main rail 12 so that other trolleys can proceed down the main rail or be switched by the transfer rail station.

The looping pipe 28 of subsidiary loop 16 slopes downwardly from its entrance 36, the point where trolleys are received from transfer rail section 24 and committed to circulate within subsidiary loop 16, so that a trolley can roll along it under the force of gravity. About midway along the looping rail 28 is the stop 38 which has an upper gate and a lower gate within the stop (neither gate shown). The stop 38 is shown stacking up trolleys 14b–d at its upper gate, trolley 14b being first in line. There the trolleys 14b-d wait until an operator 42 is ready for one and presses a button on control box 50 to open the upstream gate of stop 38 and allow trolley 14b to roll to the downstream gate located at the base of stop 38 as has done trolley 14e previously.

After a trolley is isolated at the downstream gate of stop 38, an operator such as 42 can perform a work operation such as sewing with sewing machine 45. FIG. 2 shows operator 42 working on workpiece 46 which is carried by hanger 48 on trolley 14e. The particular type of carrier used in the conveyorized transport system is not critical to the inventive concept. When operator 42 has completed the work operation on some or all workpieces suspended from hanger 48, he or she can push a button on control box 50 to cause the downstream gate of stop 38 to open and allow trolley 14e to roll under the force of gravity down sloping rail 28 toward elevator 54.

At the base of elevator 54 is another stop to collect trolleys while they wait their turn to be reloaded onto main rail 12. When the master computer senses a break in a parade of trolleys on the main rail 12 just upstream of transfer rail 24 and an absence of trolleys on transfer rail 24, the computer directs actuator 18 to move rail section 24 to subsidiary loop 16 and directs elevator 54 to elevate a trolley as it has done to trolley 14f shown in FIG. 1. Trolley 14f hangs from an elevator car which comprises a slotted track section 57 which receives the trolley.

After a trolley reaches the top of elevator 54 and the next pusher arrives from propulsion track 10, the pusher will urge the trolley from the slotted track section 57 of the elevator onto transfer rail section 24 which abuts the slotted track 57. The top of the elevator 54 is the discharge end of subsidiary loop 16. In one mode of operation, the computer directs actuator 18 to leave the transfer rail 24 in position at subsidiary loop 16 until the trolley is pushed back to the beginning of loop 16 to recirculate within the trolley within the same subsidiary loop. The mode selection is usually made via a routing program of the master computer but this first mode can also be selected manually via a switch on control box 50.

In a second mode of operation, after transfer rail 24 receives the trolley, the computer directs actuator 18 to draw transfer rail section 24 back into line with main rail 12 and after a few more moments of being pushed, the trolley will be back on main rail 12 and proceeding downstream, usually to another subsidiary loop and an associated work station.

In a third mode of operation, after transfer rail section 24 receives the trolley, the computer directs actuator 18 to move the transfer rail section further across the row of gaps into line with looping rail 30 to transfer the trolley to subsidiary loop 32. After circulating through subsidiary loop 32, the trolley can be transferred in accordance with any mode of operation described above. It is important for the first and third modes of operation that the entrance of each subsidiary loop be located downstream of its exit relative to the general direction of trolley movement on the main rail 12.

Figure 3:
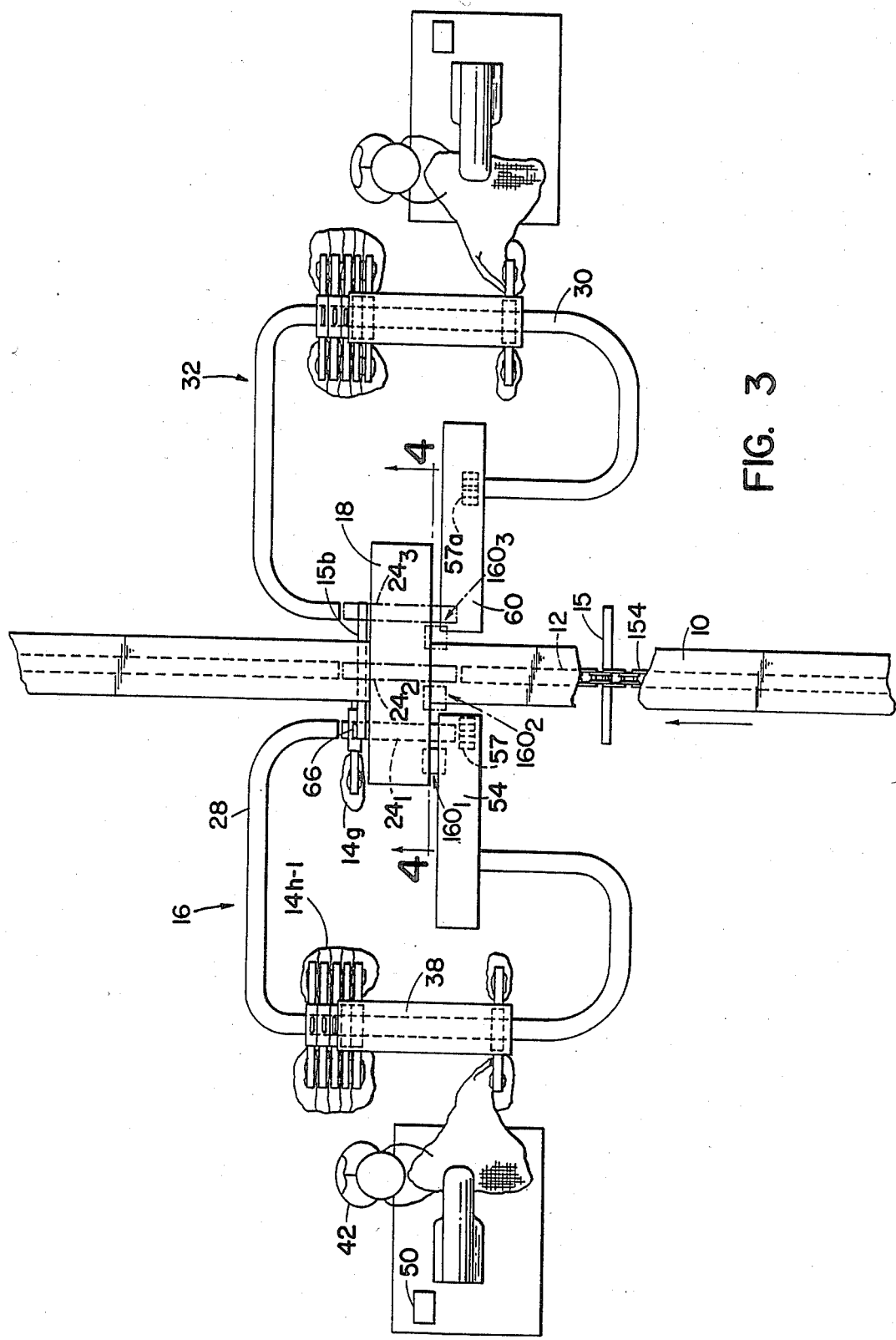
FIG. 3 is a top view of the section of the conveyorized transport system of FIG. 2 and illustrates three positions of one transfer switch and one tracking sensor.

FIG. 3 illustrates the three switching positions of transfer rail section 24. The solid lines show its position, referred to as $24_1$, where the section 24 is in line with the subsidiary loop 16. The broken lines show its other two positions, referred to as $24_2$ and $24_3$, at which the section 24 is in line with the main rail (position $24_2$) or in line with the subsidiary loop 32 (position $24_3$). FIG. 3 also illustrates pusher 15b which has an inverted T-shape and engages a crown 66 of trolley 14g to push it.

Figure 4:
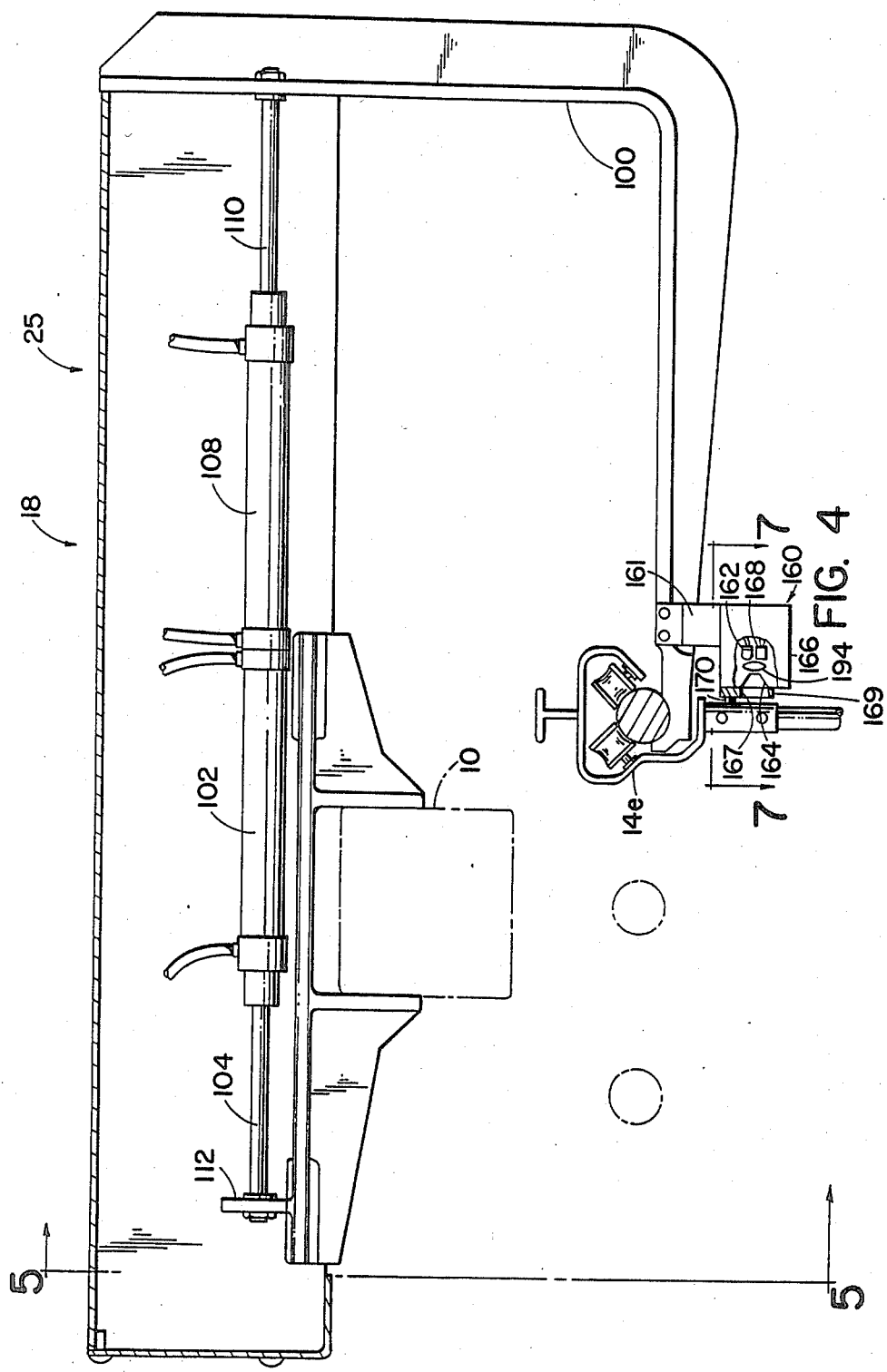
FIG. 4 is a front view in enlarged scale of the transfer switch and the tracking sensor taken on the line 4—4 of FIG. 3 and shows three possible positions of the switch.

FIG. 4 shows a front view of the actuator apparatus 18 for transfer rail section 24 and a tracking sensor 160 which is discussed below. The actuator apparatus comprises an L-shaped support bracket 100 which supports transfer rail section 24, a first piston and cylinder assembly 102 with an integrally-connected piston rod 104, and a second piston and cylinder assembly 108 with an integrally connected piston rod 110. Both piston and cylinder assemblies support and move the bracket 100 and the transfer rail section 24. The actuator apparatus also includes a bracket 112 which secures both piston and cylinder assemblies to the track 10.

When both piston rods 104 and 110 are in their extended postions as shown in FIG. 3, rail section 24 is positioned in line with looping rail 28 as shown in FIG. 1 to bridge the gap in subsidiary loop 16, when one piston rod is extended and the other is retracted, transfer rail section 24 is moved to a center position where the rail section 24 bridges the gap in main rail 12, and when both piston rods are retracted, rail section 24 is positioned in line with the looping rail 30 to bridge the gap in the subsidiary loop 32.

Figure 5:
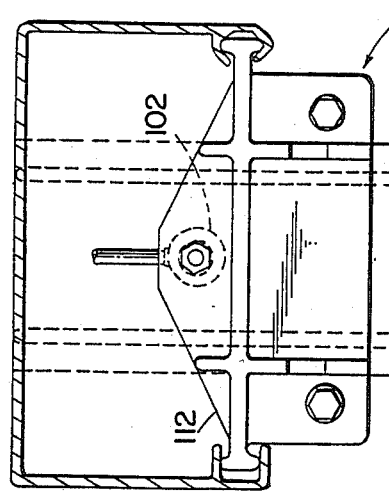
FIG. 5 is a side view in enlarged scale of the transfer switch and the sensor taken on the line 5—5 of FIG. 4.

If a subsidiary loop located adjacent the main rail is not paired with another subsidiary loop located directly across the main rail, or if there is another rail such as 31 (shown in FIG. 1) located adjacent the main rail used for diverting a trolley to another location in a factory, the respective transfer switches need only provide 2 switching positions. Consequently, the actuator apparatus for this two position switch comprises only one piston and cylinder assembly such as 102. FIG. 5 shows a side view of the actuator apparatus 18, the sensor 160 which is discussed below and the L-shaped bracket 100 which is welded to and supports transfer rail section 24.

FIG. 6 illustrates one of the trolleys 14e. A bar code label 150 is affixed to a neck of the trolley 14e and identifies the trolley with a number. By way of example, the bar code is a "two of five", width modulated type such as disclosed in Hewlett Packard application Note 1013 published in November 1983 and entitled "Elements of a Bar Code System" which publication is adopted by reference as part of the present disclosure. However, it should be clearly understood that the use of one of a variety of codes will suffice for identifying the trolley or the workpiece it carries in a manner which is machine readable, and the invention is not limited to any particular type of code which is utilized.

To load the trolley 14e onto the system 2, the trolley 14e is initially placed onto the subsidiary loop rail 30 of the subsidiary loop 32a (FIG. 1) directly above the gate 38. If desired, an operator may then sweep a wand sensor 152 over the bar code 150 of the trolley 14e to read the code number and relay the information to the master computer 8. Alternatively, the sensors 160 associated with the subsidiary loop 32a may be utilized to read the code on the trolley 14e when the trolley is first loaded onto the system 2. Consequently, the master computer learns of the existence of the trolley 14e in the system 2 and its exact location. Next, the operator may enter data into a microcomputer 5 at the work station 4 within the subsidiary loop 32a, which data indicates the type of garments or other workpieces carried by the trolley 14e and correlates the bar code to the associated workpiece.

When the master computer senses that one of the pushers 15 approaching the subsidiary loop 32a is available to engage a trolley, the computer opens the gate 38, activates the elevator 60 and activates the associated switching apparatus 18 to move the trolley 14e onto the main rail. Then the master computer directs the movement of the trolley 14e to an appropriate subsidiary loop and associated work station.

Each of the pushers 15,15 is assigned a sequence number by the master computer 8, and the master computer 8 keeps track of the location of the pushers 15,15 by tracking the motion of a chain 154 (FIG. 3) which drives the pushers 15,15. Because the computer controls the movement of the chain 154 and the switching apparatus 18,18, either controls or monitors the gates 38,38 and controls the elevators 54,54 and 60,60, the master computer is usually able to estimate the location of each trolley and the workpieces it carries. If the trolley is located on the main rail, then the master computer usually knows which pusher is currently moving the trolley, and if the trolley is currently in one of the subsidiary loops, the computer knows which subsidiary loop and which trolleys, if any, are located above or below the aforesaid trolley within the subsidiary loop.

However, as noted above, occasionally a trolley falls off or is removed from the main rail or a subsidiary loop rail or is moved from one location on the main rail or a subsidiary loop rail to another location which is not expected by the master computer. Problems of this type may occur more often in the subsidiary loops because of the large amount of contact there by operators. Under these conditions, the master computer may confuse other trolleys within the subsidiary loop rail with the misplaced or absent one and cause routing errors.

Focusing now on the invention, FIG. 4 illustrates the optical sensor 160 supported by a bracket 161 from the bracket 100 of the switching apparatus 18, which sensor is part of the tracking system 17. The sensor 160 moves with the rail section 24. An identical sensor 160 is supported by each of the other switching apparatuses 18,18 as additional components of the tracking system 17. The sensor 160 may be a fixed or moving beam type optical scanner and may be a type similar to Model CMM Welch Allyn or Model 45 of Accu-Sort Systems, Inc. of Telford, Pa., respectively. The sensor 160 comprises a light source 162, a lens assembly 194 which focuses the light source 162 through an aperture 164 of a sensor houser 166, through an aperture 167 in a guide 169 and upon the bar coded 150 when the trolley 14e is appropriately situated on the rail section 24. The sensor 160 also includes a charge coupled device 168 for reading the bar code 150. The charge coupled device 168 comprises a vertically extending row of densely packed photosensitive elements which view the code 150 through the lens assembly 194. The photosensitive elements which focus upon a bar obtain one binary level because the bars are non-reflective, and the photosensitive elements which focus upon a light region between the bars obtains the other binary level because the light regions reflect light. The charge coupled devices may be activated and read by the computer periodically after a position sensor 170 mounted to the guide 169 and taking the form of a switch in the path of the trolleys is activated. However, if desired the sensor 160 may be operated continuously without the need for the position sensor, the arrival of a bar code in front of the sensor alerting the sensor to it. The top few bars of the code 150 do not contain data but instead indicate the presence of the code and when the sensor 160 detects the presence of the code, the sensor 160 latches the output of the charge coupled devices to form one or more "snapshots" of the bar code 150; the sensor 160 acting as a camera. The sensor 160 may compare the snapshots with one another to correct reading errors. It should be noted that the sensor 160 is but one means to read the bar code 150, and if desired, other types of scanners can be substituted. Also, for other types of codes which may be substituted for the bar code 150, corresponding types of sensors may be provided so that the invention is not limited to the particular type of machine readable codes or machine sensors provided.

The guide 169 serves to steady the trolley 14e (dissipate rocking) as the trolley enters onto the transfer rail section 24 to make the sensing of the bar code 150 more reliable. As shown in FIG. 7, the guide 169 includes an arc shaped portion 180 which captures the trolley 14e and gradually limits any rocking which it exhibits as the trolley 14e proceeds in the direction indicated by an arrow 182 toward the sensor 160.

As shown in FIG. 5, the sensor 160 is supported near the upstream end of the rail section 24 so that the bar code 150 is read soon after the trolley 14e is pushed onto the rail section 24. This allows time to move the rail section 24 and the trolley 14e to the proper position in either adjacent subsidiary loop or into the gap in the main rail, as the case may be. It should be noted that the computer is able to read the code and digest the information in an instant after the bar code is positioned in front of the sensor 160.

Because the sensor 160 is located adjacent to the transfer rail section 24 and because the trolley 14e enters onto the transfer rail section 24 before entering into either subsidiary loop 16 or 32 from the main rail 12 before entering a subsidiary loop from the oppositely disposed subsidiary loop, and before recirculating within a loop, the sensor 160 is able to read the bar code 150 shortly before the trolley enters into either subsidiary loop 16 or 32 and immediately after the trolley 14e exits from either subsidiary loop 16 or 32, even if the trolley 14 is recirculated within one of the subsidiary loops or is transferred directly across to the oppositely disposed subsidiary loop. The sensor can also read the bar code 150 in the event that the trolley 14e is moved continually along the main rail 12 past a pair of subsidiary loops. It should also be noted that in addition to providing frequent tracking information updates, one sensor 160 also serves two subsidiary loops to provide economy.

To illustrate the operation of the tracking system 17 under the circumstances where a trolley is scheduled to first proceed through the subsidiary loop 16 and then through the subsidiary loop 32, when the trolley 14e is moved onto the transfer rail section 24 from the main rail 12, the sensor 160 reads the bar code 150. Then, after the trolley 14e circulates through the subsidiary loop 16 and is picked up by the transfer rail section 24, the sensor 160 again reads the bar code 150. Next, the trolley 14e is circulated through the subsidiary loop 32 and after the trolley 14e is again picked up by the transfer rail section 24, the sensor 160 again reads the bar code 150. Then the trolley 14e is moved downstream of the aforesaid subsidiary loops 16 and 32.

FIG. 8 illustrates another conveyorized transport system generally designated 200, which system comprises another embodiment of the invention. The system 200 comprises a main rail 212 and a subsidiary loop 216, which subsidiary loop 216 comprises a subsidiary loop rail 228 and a work station 233. As indicated by arrows 240,240, workpiece carriers move left to right along the main rail 212 according to the orientation of FIG. 8. As illustrated by an arrow 246, the carrier 242 circulates in a clockwise direction through the subsidiary loop 216.

The system 200 also includes pivotal switches 248 and 250 which direct the carriers 242,242 either along the main rail 212 or onto and out from the subsidiary loop rail 228. Drive means (not shown) drive the carriers 242,242 along the main rail and around the subsidiary loop 228 in the aforesaid directions. A tracking sensor 260 is supported adjacent to a portion 213 of the main rail 212, which portion 213 is located between the switches 248 and 250. The sensor 260 may be one of the aforesaid optical types or a mechanical type and is able to read codes provided on the carriers 242,242. Because the sensor 260 is located between the two switches 248 and 250 and because the carriers 242,240 circulate in the clockwise direction through the subsidiary loop 216, the sensor 260 is available to read the code on each carrier shortly before the carrier enters into the subsidiary loop 216 and shortly after the carrier exits from the subsidiary loop 216 whether the carrier is scheduled to recirculate through the same subsidiary loop 216 or is scheduled to move downstream to another subsidiary loop.

By the foregoing, conveyorized transport systems including a carrier tracking network have been provided. However, numerous modifications and substitutions may be made without deviating from the scope of the invention. For example, if desired, the sensor 60 or 260 may be an RF or IF type, and the carriers provided with codes which may be read by an RF or IF beam. Also, if desired, coded punched holes may substitute for the bar codes 150,150 and mechanical finger sensors substituted for the optical sensors 160,160 to read the punched hole codes. Therefore, the invention has been disclosed by way of illustration and not limitation.

We claim:

1. In a conveyorized transport system for transporting workpieces to a plurality of work stations which system includes a main rail; a plurality of workpiece carriers movable along said main rail, each of said carriers having an associated machine readable code; a first subsidiary loop having an entry end and a discharge end, said entry end of said first subsidiary loop being located downstream of said discharge end of said first subsidiary loop with respect to the general direction of travel of said carriers along said main rail; and a transfer rail section used for switching a first one of said carriers from said main rail to said entry end of said first subsidiary loop and switching said first carrier from said discharge end of said first subsidiary loop to said main rail, said main rail and said subsidiary loop each having a gap for receiving said transfer rail section; and means for moving said transfer rail section from a first position bridging said gap in said main rail to a second position bridging said gap in said subsidiary loop; the improvement comprising:
   sensing means for reading the code on said first carrier while said first carrier is located on said transfer rail section.

2. In the improvement to a conveyorized transport system as set forth in claim 1, said sensing means comprising
   a sensor for reading said code on said first carrier, and means for supporting said sensor in fixed relation to said transfer rail section.

3. In a conveyorized transport system as set forth in claim 2 wherein said code comprises a multiplicity of bars, said sensing means of said improvement comprising an optical scanner.

4. In a conveyorized transport system as set forth in claim 2 wherein said first carrier is a trolley, the improvement further comprising guide means for steadying said first carrier while said sensor reads said code on said first carrier.

5. In a conveyorized transport system as set forth in claim 2 wherein said codes identify said carriers, the improvement further comprising computer means for reading said sensing means and noting the location of said carriers.

6. In a conveyorized transport system as set forth in claim 1 and wherein said system further includes a second subsidiary loop located directly across the main rail from said first subsidiary loop, said second subsidiary loop having a gap for receiving said transfer rail section, an entry end located adjacent to said main rail and a discharge end located adjacent to said main rail, said entry end of said second subsidiary loop being located downstream of said discharge end of said second subsidiary loop with respect to the general direction of travel of said carriers along said main rail; and said means for moving said transfer rail section includes means for moving said transfer rail section from the position bridging said gap in said main rail to a position bridging said gap in said second subsidiary loop; said sensing means of said improvement further including:
   means for reading said code on said first carrier while said first carrier is located on said transfer rail section and said transfer rail section is located in said gap in said second subsidiary loop.

7. A conveyorized transport system for transporting workpieces to a plurality of work stations and tracking the workpieces, said system comprising:
   a main rail,
   a plurality of workpiece carriers movable along said main rail, each of said carriers having an associated machine readable code which moves with said carrier,
   a subsidiary loop located adjacent to said main rail, and having an entry end and a discharge end, said entry end of said subsidiary loop being located downstream of said discharge end of said subsidiary loop with respect to the direction of travel of said carriers along said main rail,
   switching means associated with said subsidiary loop for switching a first one of said carriers from said main rail to said entry end of said subsidiary loop and switching said first carrier from said discharge end of said subsidiary loop to said main rail, and
   sensing means for reading the code on said first carrier while said first carrier is located between a first portion of said main rail adjacent to said discharge end of said subsidiary loop and a second portion of said main rail adjacent to said entry end of said subsidiary loop.

8. A conveyorized transport system as set forth in claim 7 wherein
   said switching means comprises a transfer rail section used for transferring said trolley between said main first rail and said subsidiary loop, said main rail and said subsidiary loop each having a gap for receiving said transfer rail section; and means for moving said transfer rail section from a first position bridging said gap in said main rail to a second position bridging said gap in said subsidiary loop, and said sensing means reads said code on said first carrier while said first carrier is located on said transfer rail section.

9. A conveyorized transport system as set forth in claim 7 wherein said switching means comprises a first switch for transferring a carrier from said main rail to said subsidiary loop, a second switch for transferring a carrier from said subsidiary loop to said main rail, said first switch being located downstream of said second switch, and wherein said sensing means reads the code on said carrier while said carrier is located on an intervening portion of said main rail between said first and second switches.

10. A conveyorized transport system as set forth in claim 7 wherein said codes identify said carriers.

11. A trolley and rail network for transporting workpieces to a plurality of work stations while tracking the workpieces, said network comprising:

a main rail, a plurality of trolleys movable along said main rail, a plurality of code means supported for movement with said trolleys for locating workpieces carried by said trolleys, a subsidiary loop having an entry end located adjacent to said main rail and a discharge end located adjacent to said main rail, switching means associated with said subsidiary loop for switching a first one of said trolleys from said main rail to said entry end of said subsidiary loop and later switching said first trolley from said discharge end of said subsidiary loop to said main rail, said entry end of said subsidiary loop being located downstream of said discharge end of said subsidiary loop in relation to the direction of travel of said trolleys along said main rail, and sensing means for reading the code means on said trolleys while said trolleys are located on said switching means.

* * * * *